United States Patent
Hrle et al.

(10) Patent No.: US 10,904,354 B2
(45) Date of Patent: Jan. 26, 2021

(54) ADVANCED RESULT CACHE REFILL

(71) Applicant: INTERNATIONAL BUSINESS MACHINES CORPORATION, Armonk, NY (US)

(72) Inventors: Namik Hrle, Boeblingen (DE); Georg K. Mayer, Weil der Stadt (DE); Joachim Rese, Hockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 706 days.

(21) Appl. No.: 14/645,678

(22) Filed: Mar. 12, 2015

(65) Prior Publication Data
US 2015/0264155 A1    Sep. 17, 2015

(30) Foreign Application Priority Data
Mar. 14, 2014   (GB) .................................. 1404524.9

(51) Int. Cl.
*G06F 16/172*  (2019.01)
*H04L 29/08*   (2006.01)

(52) U.S. Cl.
CPC ........ *H04L 67/2852* (2013.01); *G06F 16/172* (2019.01)

(58) Field of Classification Search
None
See application file for complete search history.

(56) References Cited

U.S. PATENT DOCUMENTS

| | | | |
|---|---|---|---|
| 8,271,440 B2 | 9/2012 | Matsuzawa et al. | |
| 8,296,394 B1 | 10/2012 | Asher | |
| 8,478,741 B2 | 7/2013 | Santosusso | |
| 2003/0200194 A1 | 10/2003 | Arnold et al. | |
| 2006/0271557 A1 | 11/2006 | Harward et al. | |
| 2007/0169193 A1* | 7/2007 | Ikehara | G07C 9/27 726/23 |
| 2008/0098173 A1 | 4/2008 | Chidambaran et al. | |
| 2008/0120130 A1* | 5/2008 | Hartmann | G06Q 30/02 705/1.1 |
| 2009/0157659 A1* | 6/2009 | Satoh | G06F 17/30094 |
| 2009/0327257 A1* | 12/2009 | Abouzeid | G06F 17/30398 |
| 2010/0309911 A1* | 12/2010 | Eshwar | H04L 12/1859 370/390 |

(Continued)

OTHER PUBLICATIONS

Search Report for GB1404524.9 dated Sep. 15, 2014, 3 pages.

*Primary Examiner* — Kris E Mackes
*Assistant Examiner* — Tiffany Thuy Bui
(74) *Attorney, Agent, or Firm* — William Kinnaman; Matthew M. Hulihan; Heslin Rothenberg Farley & Mesiti PC (57) ABSTRACT

A capability for updating a cache. The capability includes identifying, in a query instance that has led to a filling of the cache, a parameter whose values are monotonic—in particular monotonically increasing or decreasing—over time, wherein the query instance has a first execution time. When generating a new query instance, at a second, later execution time instead of the previous value of the parameter, a new value may be used that corresponds to the monotonic previous value at the second execution time. The new query instance is executed, wherein the cache is updated with the results of the new query instance.

16 Claims, 4 Drawing Sheets

(56) References Cited

U.S. PATENT DOCUMENTS

| | | | | |
|---|---|---|---|---|
| 2011/0106574 A1* | 5/2011 | Demarcken | G06F 17/30457 | 705/5 |
| 2011/0184936 A1* | 7/2011 | Lymberopoulos | G06F 16/9574 | 707/721 |
| 2011/0202497 A1* | 8/2011 | Marschall | G06F 16/217 | 707/602 |
| 2013/0212064 A1* | 8/2013 | Mahmoud | G06F 17/30306 | 707/609 |
| 2013/0218828 A1* | 8/2013 | Lingamneni | G06F 17/3048 | 707/602 |
| 2015/0058308 A1* | 2/2015 | Zheng | G06F 17/30132 | 707/706 |
| 2015/0100574 A1* | 4/2015 | Presta | G06F 17/30584 | 707/737 |
| 2015/0339167 A1* | 11/2015 | Takeuchi | G06F 9/5077 | 718/1 |

* cited by examiner 100 method for updating a cache 102 identifying a monotonically increasing (or decreasing) parameter in a query at a first time 104 generating a new query at a second time with a new value of the monotonic parameter 106 executing the new query and updating the cache

ADVANCED RESULT CACHE REFILL

This application claims priority from United Kingdom patent application number 1404524.9, filed Mar. 14, 2014, which is hereby incorporated herein by reference in its entirety.

BACKGROUND

One or more aspects relate generally to updating a cache.

As the volume of information grows and more and more users have access to data, there is a need for more analysis capabilities. This can be a heavy burden for existing information systems and databases storing the data. More and more poly-structured data is being stored and more and more big data and business information solutions are deployed in order to analyze and aggregate a huge amount of data, usually stored in databases. The relevant data needs to be read for extracting relevant information from it. The corresponding query instances are often long-running while result sets are often rather small. The query result is usually stored in a result cache in order to reduce average query elapse time.

The result cache can be volatile—e.g., in-memory—or persistent—in a database or file system. In either case, cache entries become invalidated if one of the underlying data containers/tables is updated.

In business intelligence systems (BI systems), updates typically occur at load or batch ETL (extract transform load) processing. Invalidated cache entries are rebuilt at query time. Thus, after data has been updated or loaded in the underlying database, average query elapsed time increases until the result caches are updated and populated again.

Technologies exist already for updating caches: Document U.S. Pat. No. 8,478,741 B2, which is hereby incorporated by reference herein in its entirety, discloses a method for automatically refreshing a materialized query table (MQT) in a computer database to improve database performance. The update is based on an estimated time required for executing a query instance.

Document U.S. Pat. No. 8,271,440 B2, which is hereby incorporated by reference herein in its entirety, discloses an apparatus with base table storage sections that store base tables and delta tables for the base tables, and a summary table storage section that stores a summary table for storing results of query instances to a plurality of base tables and delta information about the summary table. There is also a delta data processing section that inserts delta data of the base tables into the delta tables, and a delta computing processing section that generates delta information about the summary table.

SUMMARY

According to one aspect, a method for updating a cache may be provided. The method may comprise identifying in a query instance that has led to a filling of the cache, a parameter whose values may be monotonic over time. The query instance may have a first execution time. The method may further comprise generating a new query instance at a second execution time using therein, instead of the previous value of the parameter, a new value that corresponds to the monotonic previous value at the second execution time. The method may additionally comprise executing the new query instance, thereby updating the cache.

According to another aspect, a cache updating unit may be provided. The cache updating unit may comprise an identifying unit adapted for identifying in a query instance that has led to a filling of the cache, a parameter whose values may be monotonic over time, wherein the query instance has a first execution time. The cache updating unit may further comprise a generating unit adapted for generating a new query instance, at a second execution time using therein, instead of the previous value of the parameter, a new value that corresponds to the monotonic previous value at the second execution time. Moreover, there may be an execution unit as part of the cache updating unit. The execution unit may be adapted for executing the new query instance, thereby updating the cache.

BRIEF DESCRIPTION OF THE SEVERAL VIEWS OF THE DRAWINGS

Embodiments of the invention will now be described, by way of example only, and with reference to the following drawings.

DETAILED DESCRIPTION

It may be noted that the term monotonic may come in two flavors: monotonically increasing or monotonically decreasing.

It may also be noted that the first time may be earlier than the second time. At the second time, a parameter with monotonically increasing—or decreasing—values may be set to an actual time value and a cache may be updated dynamically.

In the context of this description, the following conventions, terms and/or expressions may be used:

The term "query instance" may denote one specific occurrence of a query execution in time. If a query instance itself is an abstract expression having conditions and may be run against a set of data—e.g., a database—the query instance may be an actual incarnation of the abstract expression executed at a specific point in time against a database.

The term monotonic may denote the mathematical understanding of a value of a parameter that may have always increasing or always decreasing values. For monotonically increasing parameters, values of the parameters $v_i$ have the following characteristics: $v_1(t_1) \leq v_2(t_2)$, if $t_1 < t_2$, wherein $t_i$ denotes time instances.

For monotonically decreasing parameter values, the equivalent holds true.

In accordance with one or more aspects, the cache may be updated automatically at load times of the data in a database relating to the cache. Cache entries may be updated reflecting the implicit knowledge of the monotonic behavior of some parameters. These caches may undergo updates, e.g., at ETL times of a BI system without any database administrator involvement. The dynamic updates of the cache increase the average response time of a database for query instances. The bigger the database is and the more caches are maintained, the higher the gain in terms of performance increase may be.

In one or more aspects, performance of query instances increases in a flexible way without requiring database administrator activities.

According to one embodiment, the values of the parameter are monotonically increasing over time. Alternatively—in another embodiment—the values of the parameter are monotonically decreasing over time.

According to one specific embodiment, the parameter that may be monotonically increasing over time represents time. Time may represent the date or the time in seconds, minutes, hours, day, month, and/or year. This may be a typical application of the method. However, other data types may exist having the same increasing characteristic. Serial numbers of produced parts may be another example of a monotonic parameter. A third example may be the numbering of incoming invoices to a company, or of outgoing invoices.

In another embodiment, the monotonic characteristic of the parameter may be stored in metadata relating to the parameter. This way, an easy application of the method may be practiced. In a software-based implementation, one only needs to look at the metadata in order to decide whether the method may be applicable.

According to one further embodiment, the query instance may be stored together with related cache entries. The query instance may be stored in source code form; thus, it may be compared at a later point in time to other query instances.

According to an ever further embodiment, a cache hit number may be stored—in particular, a hit count—together with related cache entries. The hit counter may build the basis for a decision about updating the cache at ETL time. A cache with a low number of hits—e.g., below a threshold value—may be not updated or even built at load time.—The cache hit number may be increased—e.g., by 1—every time data may be read out of the cache after an incoming query instance.

As already mentioned above, in one embodiment, the second execution time may correspond to a load time of an online analytical processing system (OLAP). Thus, the update of the cache may be performed not during an online access to the data but upfront when preparing a new version of the underlying data warehouse system and its data. Thus, the new cache may be ready for use instantly after the update of the underlying data containers or data tables has been finalized.

In order to guarantee cache insistence, in one embodiment, a cache valid flag of the cache may be reset if the underlying data corresponding to the cache undergoes an update. The update may comprise an add-, a modify- or, a delete-operation to the related data.

The cache may come in different implementations. According to one embodiment, the cache may be one out of the group comprising a query result cache, a pre-calculated report, a pre-calculated form, a pre-determined web page, an aggregate, and a materialized table query. Also other data container types may be applicable.

In order to keep computational load under control, according to one embodiment, the new query instance may only be generated if the cache hit number exceeds a pre-defined hit threshold number. This way, a dynamic rebuilding of caches may be controlled according to performance needs and available computing time and offline time of the underlying data containers.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, e.g., between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, block diagrams of embodiments of the method for updating a cache are given. Afterwards, further embodiments of a cache updating unit and a related computing system are described.

Figure 1:
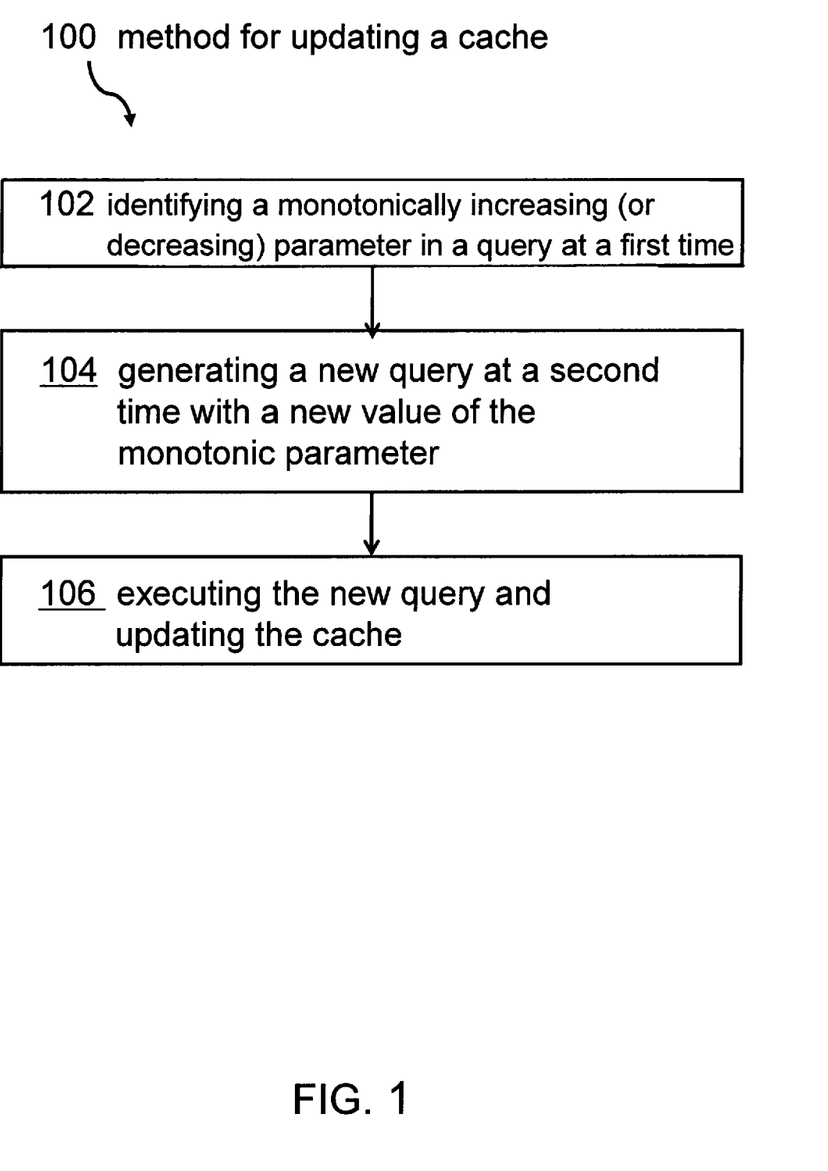
FIG. 1 shows one example of a block diagram of an embodiment of updating a cache.

FIG. 1 shows a block diagram of an embodiment of a method 100 for updating a cache, e.g., of a database. The method may comprise identifying, 102, in a query instance that may have led to a filling of the cache, a parameter, whose values may be monotonic, in particular monotonically increasing or monotonically decreasing over time. The parameter may indicate a date, a time, a serial number, or other parameter types which may have natural sequencing. The monotonic data type may be defined in metadata. The query instance may have a first execution time. Furthermore, the method may comprise the step of generating, 104, a new query instance at a second execution time. The second execution time may be later than the first execution time, e.g., during an ETL process for the data in a database underlying the cache. While executing the new query instance, instead of the previous value of the parameter, a new value that may correspond to the monotonic previous value at the second execution time may be used. In other words, the new value corresponds to the previous value that has been changed in accordance with the monotonic property of the parameter, using the second execution time.

As a next step, the method may comprise executing, 106, the new query instance, thereby updating the cache, in particular with the results of the new query instance. Thus, the cache may be updated during an ETL process. It may not be necessary to update the cache during runtime of the database system which may lead to a performance degradation.

Figure 2:
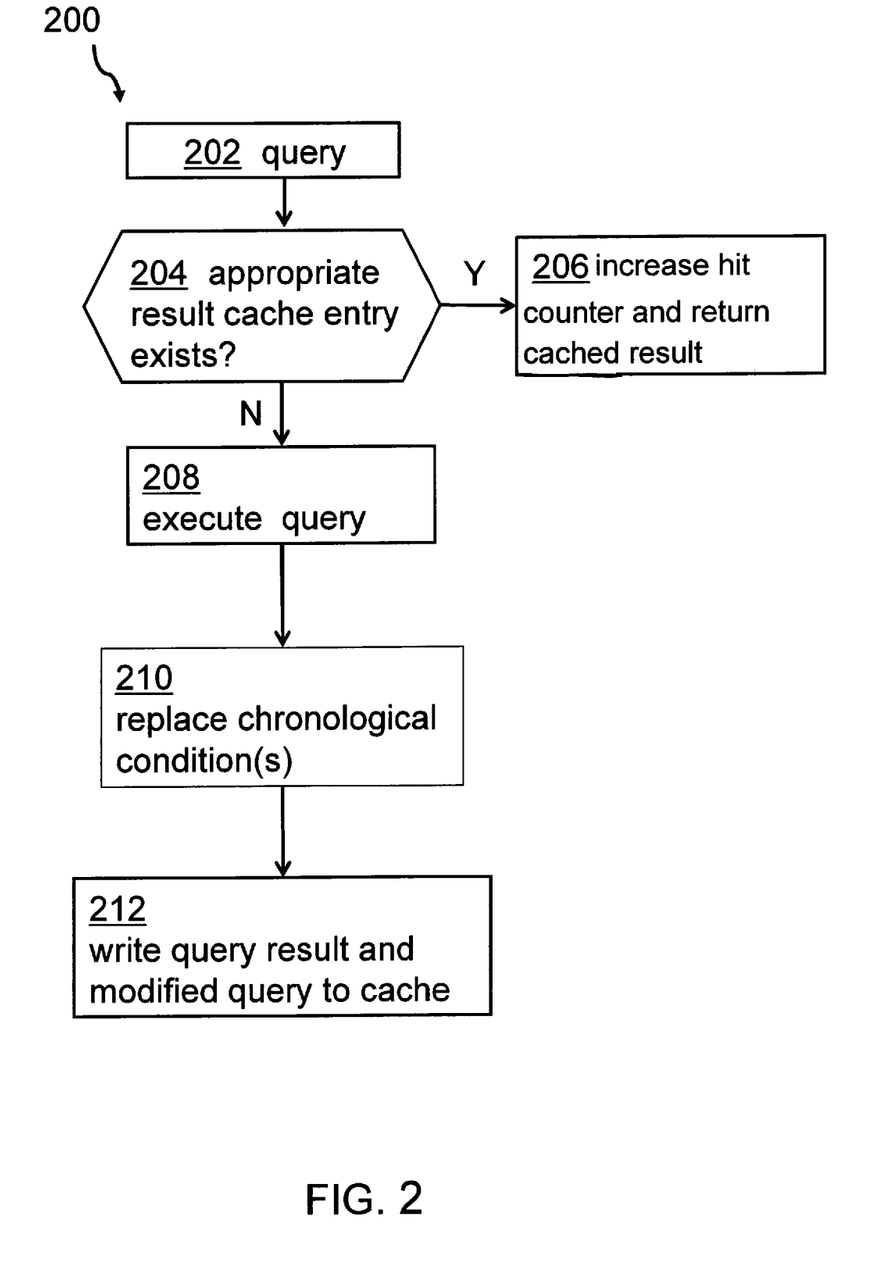
FIG. 2 shows one example of an embodiment of a more detailed block diagram of updating a cache during online time of a BI system.

FIG. 2 shows a more detailed block diagram 200 of an embodiment of the method 100 for updating a cache during online time of, e.g., a BI system. A query instance may reach the system, 202. At 204, it may be checked whether an appropriate result cache exists to satisfy the query requirements. If "yes" a hit counter may be increased and the queried result may be returned, 206.

In case of "no" the query instance may be executed, 208. The chronological condition or conditions may be updated and stored, 210, in source code form, and the query results may be updated, 212, in the cache in the modified, more actual, form and may also be returned as usual. Thus, the cache may constantly be updated using the actual value of the monotonic parameter. This is possible because of the monotonic character of the related parameter.

Figure 3:
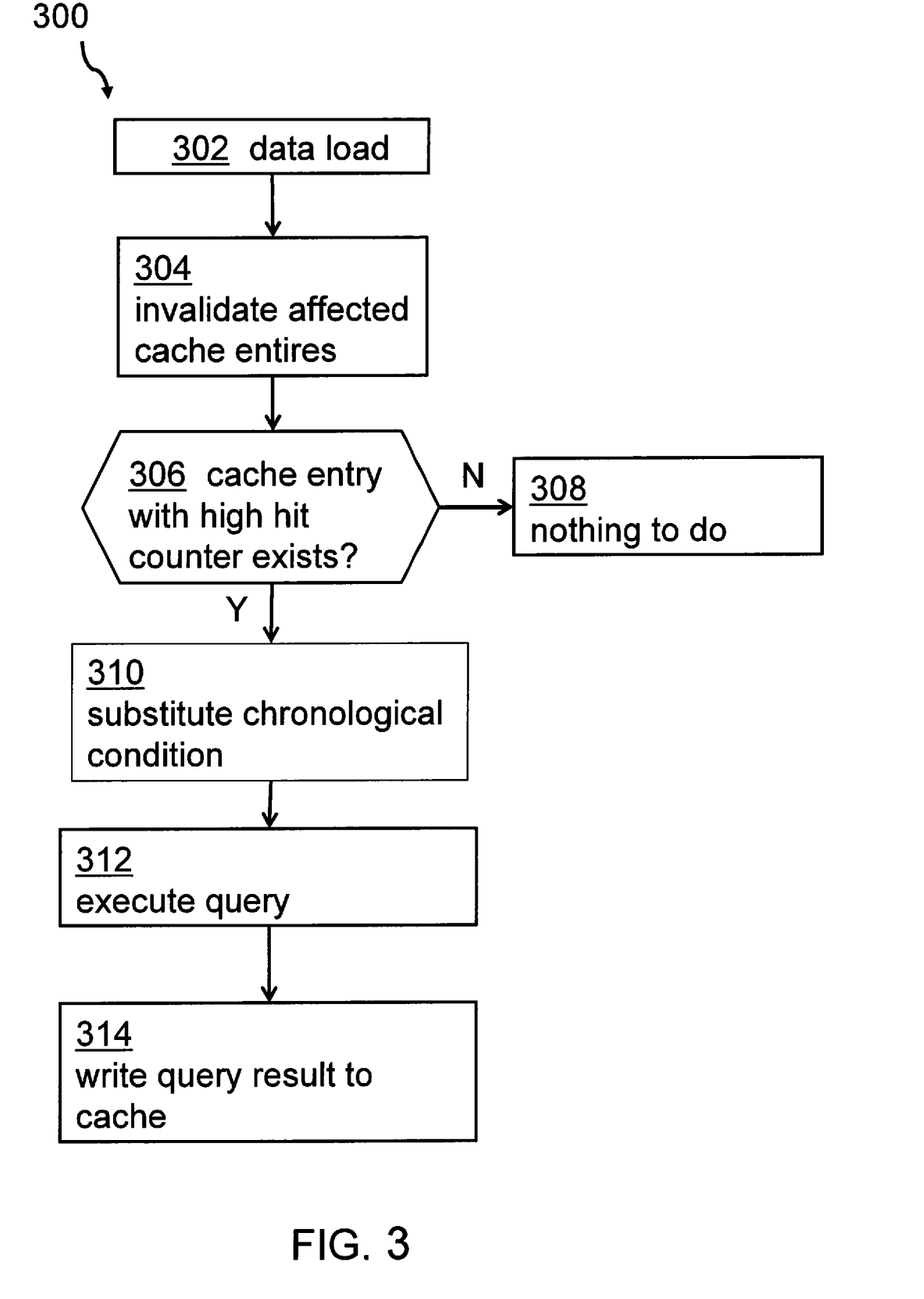
FIG. 3 shows one example of an embodiment of a more detailed block diagram of updating a cache during ETL time of the BI system.

FIG. 3 shows a more detailed block diagram 300 of an embodiment of the method 100 for updating a cache during ETL time of the, e.g., BI system. Here, not the online function but the method steps at offline time, e.g., ETL time, are examined.

New data may be loaded, 302, to a database underlying the cache. Firstly, caches that are affected by the new data may be invalidated, 304. It may be tested whether during the loading process of the underlying database a cache entry relating to the loaded data exists with a high hit counter, 306. A test against a threshold value may be used. In case of "no", nothing needs to happen, 308.

In case of "yes", the chronological condition or conditions relating to the query instance may be updated to the actual value, 310. The query instance may be executed, 312, and the query result may be used to update, 314, the cache without an external query instance. The query instance—in the expression of the above terminology—may be the new query instance at a second execution time. This second execution time may be the ETL time of the BI system.

A generic structure of the cache may look as detailed in table 1. As an example, the following context may be used:

At 2013 Jul. 25 the table BIG_TAB of a database may have been loaded up to a package number 34 that may be shipped. It may be noted that—in this example—package numbers only increase in value, i.e., are monotonically increasing. A query instance may be executed afterwards:

```
SELECT REVENUE FROM BIG_TAB
    WHERE CALENDER_DAY = 2013/07/24 AND
    PACKAGE_NO = 34
```

The related cache may look as shown in table 1.

TABLE 1

| RESULT SET | 0 hits recently | SELECT REVENUE FROM BIG_TAB WHERE CALENDER_DAY = #TODAY-1 AND PACKAGE_NO <= #CURRENT_ID |
|---|---|---|

Thus, the cache may comprise the RESULT SET as a core component of the cache. There may also be the hit counter "hits recently" as well as the source code of the query instance which may be stored together with the hit counter for the RESULT SET and the RESULT SET itself. In the above example, a certain logic may be required to conclude the value of "#TODAY-1" as well as "#CURRENT_ID".

Over time, several query instances may be run against the cache, as shown in the context of FIG. 2.

At a later point in time, e.g. at 2013 Jul. 28, the table BIG_TAB may be loaded up with information to package 42. This may be performed during a load process at ETL time of a BI system. During the load process of data to the underlying database, the cache may be updated as well.

After the data entry into the database underlying the cache, the cache may look as shown in table 2.

TABLE 2

| RESULT SET invalidated | 5164 hits recently | SELECT REVENUE FROM BIG_TAB WHERE CALENDER_DAY = #TODAY-1 AND PACKAGE_NO <= #CURRENT_ID |
|---|---|---|

It may be noted that instead of the RESULT SET a flag may be set indicating that the RESULT SET is invalid. Table 2 shows also that recently 5164 hits to the cache may have happened.

The values of "#TODAY-1" as well as "#CURRENT_ID" may be filled with actual values at the second query instance time. The query instance to be executed—as already discussed in the context of FIG. 3—may, in this example, have the form:

```
SELECT REVENUE FROM BIG_TAB
    WHERE CALENDER_DAY = 2013/07/27 AND
    PACKAGE_NO = 42
```

Thus, the cache may be updated during the ETL process. It may not be required to load the cache during a later runtime of the database and the cache. Such an online filling of the cache may slow down the database with its cache(s). Consequently, an increased performance of the database may be achieved.

Figure 4:
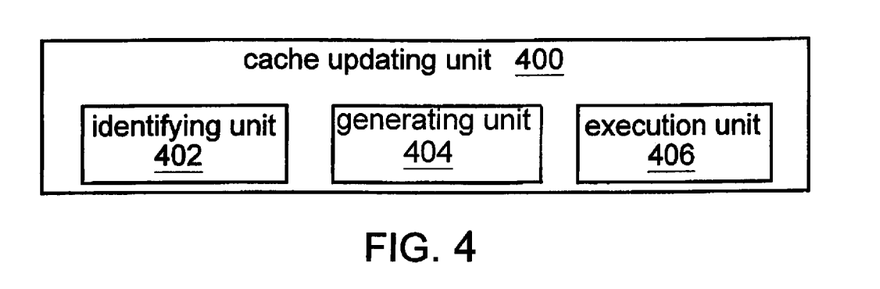
FIG. 4 shows one example of a schematic embodiment of a cache updating unit.

FIG. 4 shows a block diagram of an embodiment of a cache updating unit 400. The cache updating unit 400 may comprise an identifying unit 402 adapted for identifying in a query instance that may have led to a filling of the cache, a parameter whose values are monotonic over time. The query instance may have a first execution time, as explained above.

A second block, a generating unit 404 adapted for generating a new query instance at a second execution time, is shown. Again, as expressed above, here, instead of the previous value of the parameter, a new value of the parameter may be used that corresponds to the monotonic previous value at the second execution time. Because of the monotonic characteristic of the parameter, this may be a distinct value.

A third block of the cache updating unit 400 is an execution unit 406 adapted for executing the new query instance. During this, the cache may be updated accordingly.

Figure 5:
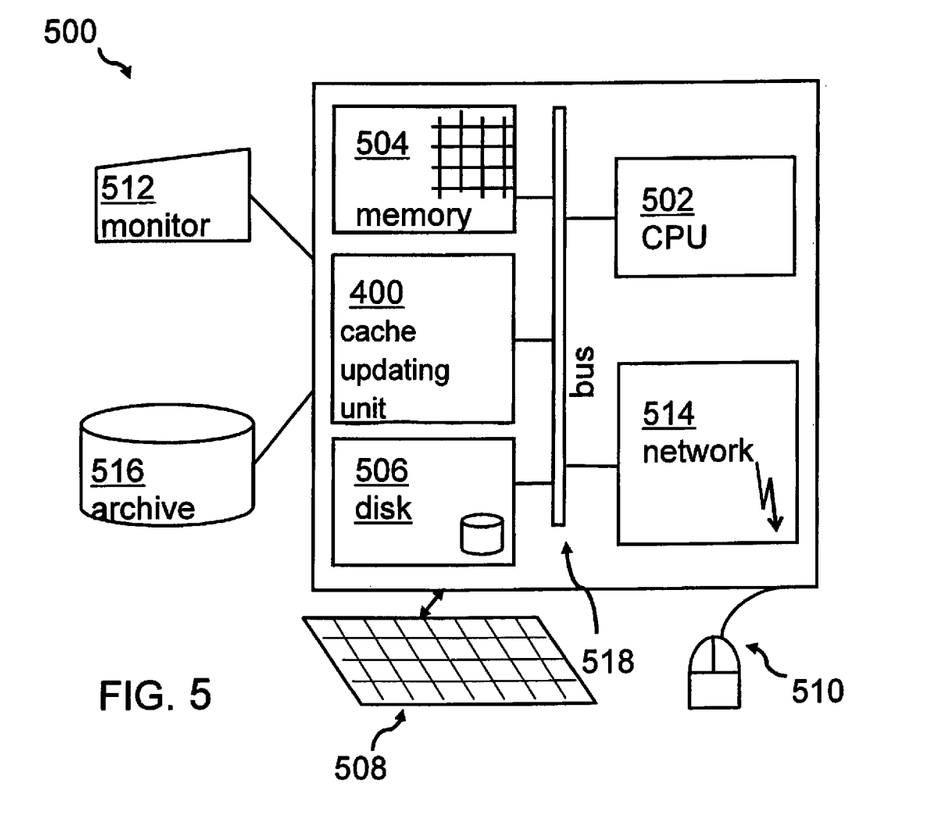
FIG. 5 shows one example of an embodiment of a computing system comprising the cache updating unit.

Embodiments of the invention may be implemented together with virtually any type of computer, regardless of the platform, suitable for storing and/or executing program code. For example, as shown in FIG. 5, a computing system 500 may include one or more processor(s) 502 with one or more cores per processor, associated memory elements 504, an internal storage device 506 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 504 may include a main memory, e.g., a random access memory (RAM), employed during actual execution of the program code, and a cache memory, which may provide temporary storage of at least some program code and/or data in order to reduce the number of times code and/or data is retrieved from a long-term storage medium or external bulk storage 516 for an execution. Elements inside the computer 500 may be linked together by means of a bus system 518 with corresponding adapters. Additionally, the cache updating unit 400 may be attached to the bus system 518.

The computing system 500 may also include input means such as a keyboard 508, a pointing device such as a mouse 510, or a microphone (not shown). Alternatively, the computing system may be equipped with a touch sensitive screen as a main input device. Furthermore, the computer 500, may include output means such as a monitor or screen 512 (e.g., a liquid crystal display (LCD), a plasma display, a light emitting diode display (LED), or cathode ray tube (CRT) monitor). The computer system 500 may be connected to a network (e.g., a local area network (LAN), a wide area network (WAN), such as the Internet or any other similar type of network, including wireless networks via a network interface connection 514. This may allow a coupling to other computer systems, or a storage network, or a tape drive. Those skilled in the art will appreciate that many different types of computer systems exist, and the aforementioned input and output means may take other forms. Generally speaking, the computer system 500 may include at least the minimal processing, input and/or output means, necessary to practice embodiments of the invention.

While aspects of the invention have been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the claims. Also, elements described in association with different embodiments may be combined. It should also be noted that reference signs in the claims, if any, should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below, if any, are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications, as are suited to the particular use contemplated.

What is claimed is:

1. A method of updating a cache of query results, the method comprising:
identifying, in a first instance of a query against a database relating to the cache, that has led to a filling of the cache of query results, a parameter, of the first instance of the query, whose values are monotonic over time, the parameter being a variable value used in execution of the first instance of the query, wherein values of the parameter are monotonically decreasing over time in accordance with a monotonically decreasing property of the parameter, and wherein the first instance of the query has a first execution time;
triggering automatic generation of a second, and new, instance of said query, the second instance of said query to be issued against the database and to be executed, the automatic generation being triggered by modification of data in the database relating to the cache, and the triggering of the automatic generation occurring at a time the data is modified in the database relating to the cache, the time the data is modified being a second execution time, the automatic generation of the second instance of said query being at the second execution time prior to execution of the second instance of said query, and the automatic generation of the second instance of said query at the second execution time using therein, instead of a previous value of the parameter used in execution of the first instance of said query having the first execution time, a new value of the parameter, at the second execution time, that monotonically changes from the previous value of the parameter between the first execution time and the second execution time, wherein the first execution time of the first instance of said query corresponds to an online time and the second execution time of the second instance of said query corresponds to an offline load time of an online analytical processing system; and
executing the second instance of said query against the database, the executing using the new value of the parameter, thereby updating the cache.

2. The method according to claim 1, wherein a monotonic characteristic of the parameter is stored in metadata relating to the parameter.

3. The method according to claim 1, wherein the first instance of said query that has led to the filling of the cache is stored, in source code form, together with related cache entries.

4. The method according to claim 1, wherein a cache hit number is stored in the cache together with related cache entries, the cache hit number indicating a number of times a query result generated based on executing the first instance of said query that has led to the filling of the cache has been read out from the cache.

5. The method according to claim 4, wherein the cache hit number is increased every time data is read out of the cache.

6. The method according to claim 4, wherein the triggering is based on the cache hit number reaching a threshold.

7. The method according to claim 1, wherein a cache valid flag of the cache is reset, based on underlying data, of the database relating to the cache, undergoing an update.

8. The method according to claim 1, wherein the cache is one out of a group comprising a query result cache, a pre-calculated report, a pre-calculated form, a pre-determined web page, an aggregate, and a materialized table query.

9. The method according to claim 1, wherein the time of modifying data in the database relating to the cache is an extract, transform, load (ETL) processing time of a business intelligence system.

10. A cache updating unit of a computer system, the cache updating unit comprising computer hardware in communication with a hardware bus system of the computer system and a processing circuit of the computer system, and the cache updating unit comprising:
an identifying unit adapted to identify, in a first instance of a query against a database relating to a cache, that has led to a filling of the cache of query results, the cache being of the computer system, a parameter, of the first instance of the query, whose values are monotonic over time, the parameter being a variable value used in execution of the first instance of the query, wherein values of the parameter are monotonically decreasing over time in accordance with a monotonically decreasing property of the parameter, and wherein the first instance of the query has a first execution time;

a generating unit adapted to automatically generate a second, and new, instance of said query to be issued against the database and to be executed, the automatic generation of the second instance of said query instance being based on a trigger at a time data is modified in the database relating to the cache and the automatic generation of the new query instance being based on the data being modified in the database relating to the cache, the time the data is modified being a second execution time prior to execution of the second instance of said query, the automatic generation of the second instance of said query at the second execution time using therein, instead of a previous value of the parameter used in execution of the first instance of said query, a new value of the parameter, at the second execution time, that monotonically changes from the previous value of the parameter between the first execution time and the second execution time, wherein the first execution time of the first instance of said query corresponds to an online time and the second execution time of the second instance of said query corresponds to an offline load time of an online analytical processing system; and an execution unit adapted to execute the second instance of said query against the database, the executing using the new value of the parameter, thereby updating the cache.

11. A computer program product for updating a cache of query results, the computer program product comprising:

a computer readable storage medium readable by a processing circuit and storing instructions for execution by the processing circuit for performing a method comprising:

identifying, in a first instance of a query against a database relating to the cache, that has led to a filling of the cache of query results, a parameter, of the first instance of the query, whose values are monotonic over time, the parameter being a variable value used in execution of the first instance of the query, wherein values of the parameter are monotonically decreasing over time in accordance with a monotonically decreasing property of the parameter, and wherein the first instance of the query has a first execution time;

triggering automatic generation of a second, and new, instance of said query, the second instance of said query to be issued against the database and to be executed, the automatic generation being triggered by modification of data in the database relating to the cache, and the triggering of the automatic generation occurring at a time the data is modified in the database relating to the cache, the time the data is modified being a second execution time, the automatic generation of the second instance of said query being at the second execution time prior to execution of the second instance of said query, and the automatic generation of the second instance of said query at the second execution time using therein, instead of a previous value of the parameter used in execution of the first instance of said query having the first execution time, a new value of the parameter, at the second execution time, that monotonically changes from the previous value of the parameter between the first execution time and the second execution time, wherein the first execution time of the first instance of said query corresponds to an online time and the second execution time of the second instance of said query corresponds to an offline load time of an online analytical processing system; and executing the second instance of said query against the database, the executing using the new value of the parameter, thereby updating the cache.

12. The computer program product according to claim 11, wherein a monotonic characteristic of the parameter is stored in metadata relating to the parameter.

13. The computer program product according to claim 11, wherein the first instance of said query that has led to the filling of the cache is stored, in source code form, together with related cache entries.

14. The computer program product according to claim 11, wherein a cache hit number is stored together with related cache entries, the cache hit number indicating a number of times a query result generated based on executing the first instance of said query that has led to the filling of the cache has been read out from the cache.

15. The computer program product according to claim 14, wherein the cache hit number is increased every time data is read out of the cache.

16. The computer program product according to claim 11, wherein the cache is one out of a group comprising a query result cache, a pre-calculated report, a pre-calculated form, a pre-determined web page, an aggregate, and a materialized table query.

* * * * *